W. DIETER.
SPEED CONTROL FOR AUTOMOBILE TORPEDOES.
APPLICATION FILED APR. 15, 1913.
1,131,341.
Patented Mar. 9, 1915.
Fig. 1.
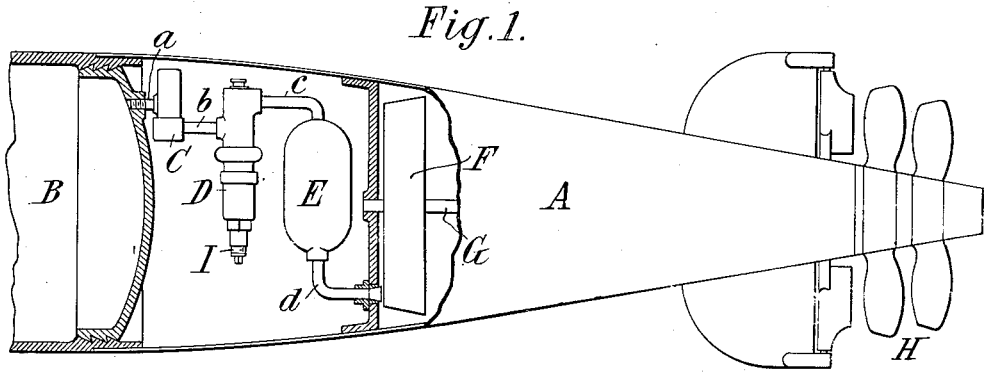
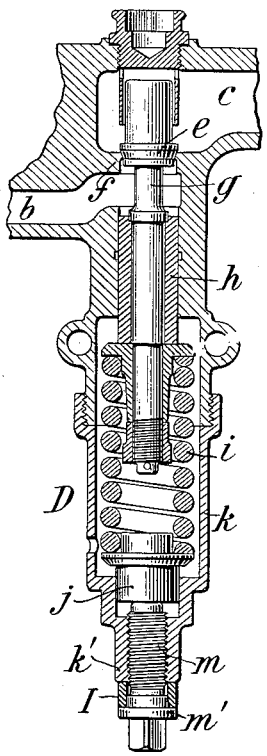
Fig. 2.
Fig. 3.    Fig. 4.    Fig. 5.
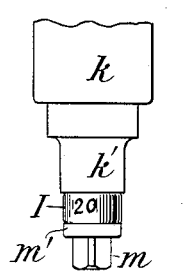 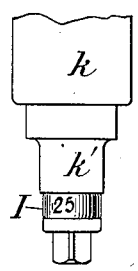 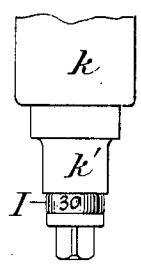
Fig. 6.
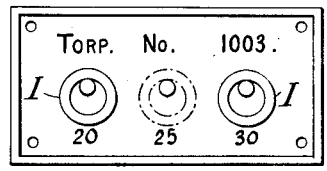
WITNESSES:
René Bruine
Fred White
Fig. 7.
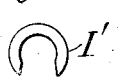
INVENTOR:
William Dieter,
By Attorneys,
Fraser, Turk & Myers

UNITED STATES PATENT OFFICE.

WILLIAM DIETER, OF NEW YORK, N. Y., ASSIGNOR TO E. W. BLISS COMPANY, OF BROOKLYN, NEW YORK, A CORPORATION OF WEST VIRGINIA.

SPEED CONTROL FOR AUTOMOBILE TORPEDOES.

1,131,341. Specification of Letters Patent. Patented Mar. 9, 1915.

Application filed April 15, 1913. Serial No. 761,291.

*To all whom it may concern:*

Be it known that I, WILLIAM DIETER, a citizen of the United States, residing in the borough of Brooklyn, county of Kings, city and State of New York, have invented certain new and useful Improvements in Speed Control for Automobile Torpedoes, of which the following is a specification.

In automobile torpedoes the speed at which any given torpedo will run is determined by the pressure at which the motive fluid is fed to the engine. This pressure is determined by a pressure reducing valve interposed between the compressed air reservoir and the engine. The adjustment of this valve for a given pressure corresponding to a desired speed has heretofore been a matter of difficulty and some uncertainty.

The present invention is designed to improve and facilitate the speed control of such torpedo.

The invention may be understood from the accompanying drawings which show its preferred form.

Figure 1 is a general view partly in vertical longitudinal section showing in diagrammatic arrangement those operative parts which are necessary to an understanding of the invention; Fig. 2 is a vertical mid-section of the reducing valve; Figs. 3, 4 and 5 are fragmentary elevations showing this valve set for three different speeds; Fig. 6 is an elevation of a box or receptacle for holding the speed gages; Fig. 7 is a plan of a modified gage.

Referring to Fig. 1, A is the hull of the torpedo, B is the compressed air reservoir, C is the starting valve, D is the pressure reducing valve, E is the usual heater, F is the engine, here shown as a turbine, G is the propeller shaft, and H indicates the propeller screws. The pipes $a$ $b$ $c$ $d$ convey the compressed air successively from the reservoir to the valves C, D, heater E, and to the engine. The pressure reducing valve D may be of any suitable type or construction. That used in the well known Bliss-Leavitt torpedo is shown in detail in Fig. 2. It comprises a tappet $e$ closing against a seat $f$ forming the opening or passage between the high-pressure inlet $b$ and the reduced-pressure outlet $c$. This tappet is on a stem $g$, on which also is fastened a piston $h$ of an area slightly greater than that of the seat $f$, so that the air pressure tends to seat the tappet $e$. This pressure is resisted by a spring $i$ reacting against an abutment $j$ and pressing against the piston $h$ so that its stress tends to unseat the tappet. The spring $i$ is inclosed in a spring chamber formed by a shell $k$, into the reduced end or neck $k'$ of which screws an adjusting screw $m$ by means of which the abutment $j$ may be displaced and the spring $i$ tightened or relaxed. Hence by adjusting the screw $m$ the valve may be set to deliver air at higher or lower pressures as desired.

In order to determine the speed at which the torpedo shall run, it is necessary to adjust the reducing valve to deliver air at a pressure corresponding to that speed. In practice, the valve is adjusted to deliver the air at a pressure which should (as determined by computation or previous experiments) result in the torpedo being driven at a given speed. The torpedo is then tested and the speed measured, and if the speed actually developed differs from that which should result, the valve is readjusted, and this is repeated if necessary until the precise desired speed is attained. This operation is repeated for each of the speeds at which it is desired to be able to run the torpedo, (say for example at 20, 25 and 30 knots per hour respectively).

Heretofore it has been customary to make coinciding marks on the valve shell and screw respectively for each such speed adjustment. For example these marks might be made on the exterior of the neck $k'$ and on a flange $m'$ on the screw. Then before launching the torpedo for a run, the screw was turned to bring the marks for the desired speed into coincidence. This has been difficult and objectionable because the marks are obscure and liable to be confounded one for another, so that the operator may set the torpedo for a different speed from that intended; it is also difficult to determine the exact coincidence of the marks, and even a slight variance is liable to materially affect the speed; and at best this adjustment is one that requires close attention and takes considerable time, which in actual warfare would be objectionable as it might delay the launching until the most favorable opportunity for discharging the torpedo had passed.

According to the present invention I provide each torpedo with a series of gages each of which corresponds to a certain speed. For example if a torpedo is designed to travel at speeds of 20, 25 and 30 knots respectively, three gages will be provided one for each such speed respectively. If the operator desires to set the torpedo to run at say 25 knots, he has only to select the gage corresponding to that speed and apply it to the reducing valve D, and then adjust the screw m to the extent permitted by this gage. The dimensions of the gages being previously determined according to the respective speeds, the engagement of either gage by the adjusting screw will determine its proper adjustment for the speed to which that gage corresponds. The gages are most conveniently made as rings and are so shown in the drawing, being lettered I. In Fig. 2 the gage is shown in place, being embraced between the end of the neck k' and the flange m' on the screw. In Figs. 3, 4 and 5 the valve is shown provided respectively with gages of three different sizes corresponding to the assumed speeds of 20, 25 and 30 knots respectively.

In Fig. 6 is shown a box or casing J which accompanies the torpedo and bears its number (in this case "Torpedo No. 1003") and has holders for receiving the respective gages, and is marked with numbers corresponding to their respective speeds. This box J may be the usual box which accompanies each torpedo, and contains all of the special fittings or appurtenances belonging to it; or it may be a special receptacle inside such box. It is of course understood that the gages are finished to such lengths or dimensions as correspond to the adjustments of the screw for each of the respective speeds desired; such adjustments being made in the same manner as hereinbefore explained.

In the use of the present invention, when it is desired to launch the torpedo the operator has only to go to the box J, select from it the gage ring of the desired speed, and apply this ring to the reducing valve. For this purpose with the construction shown he has only to unscrew the screw m, slip the gage ring over it and screw it back, tightening it until its flange closely embraces or pinches the gage ring. An important advantage of this invention is that after the adjustment has thus been made and the torpedo has been prepared for launching, or after it has been placed in the launching tube, or even after it is launched, or even after the end of its run, the operator or any one else having access to the box J may determine at what speed the torpedo was set, since the gage which is missing from this box (for example the one shown in dotted lines in Fig. 6) is the one which was used, and consequently this shows the speed for which the torpedo was adjusted.

With this invention it is practically impossible to misadjust the speed. The operation of adjustment requires no close attention, can be performed very rapidly so that much valuable time is saved, and as stated it leaves its own record.

The invention is susceptible of considerable modification, not being limited to the precise construction shown. As an example of one such modification, I show in Fig. 7 a gage ring I' which is mutilated, being cut open on one side so that by only partially slacking off the screw m the gage may be sprung into place and the screw then retightened against it. Other modifications and other forms of gages may be applied.

I claim as my invention:—

1. In an automobile torpedo, a reducing valve having a screw adjustment for regulating the pressure of fluid, combined with a speed gage consisting of a filling piece for determining the adjustment corresponding to a given speed.

2. In an automobile torpedo, a reducing valve having a screw adjustment for regulating the pressure of fluid, combined with a speed gage consisting of an annular filling piece adapted to fit beneath the head of such screw for determining the adjustment thereof corresponding to a given speed.

3. In an automobile torpedo, a reducing valve having a screw adjustment for regulating the pressure of fluid, combined with a series of speed gages consisting of filling pieces of different sizes for determining the adjustment corresponding to a series of given speeds.

In witness whereof, I have hereunto signed my name in the presence of two subscribing witnesses.

WILLIAM DIETER.

Witnesses:
GEO. LEICH,
FREDK. C. FLADD.